Sept. 6, 1960　　　　H. A. LOCKWOOD　　　　2,951,461
HUMIDITY INDICATOR DEVICE AND COMBINATION THEREOF WITH CONTAINER
Filed Nov. 12, 1958
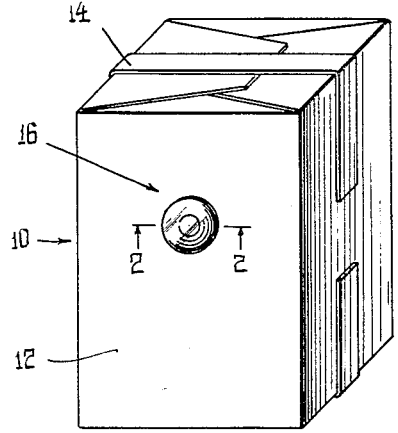
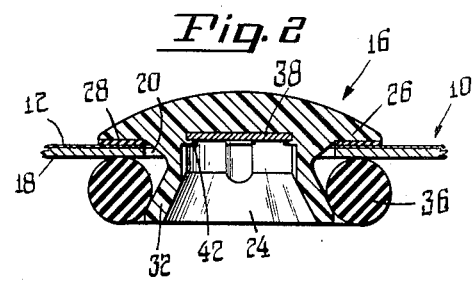
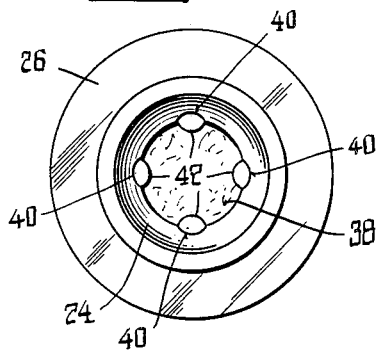
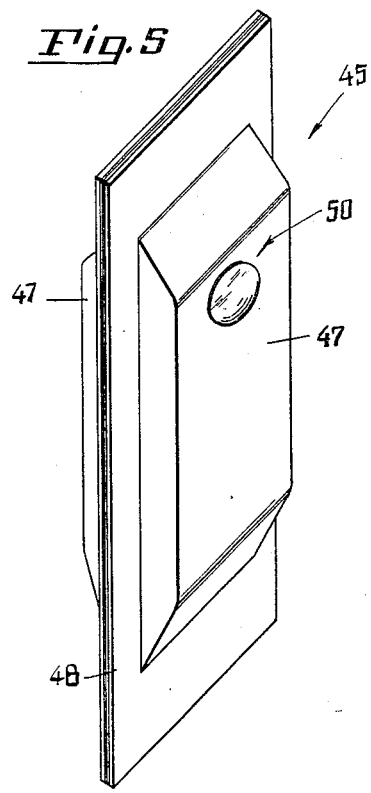
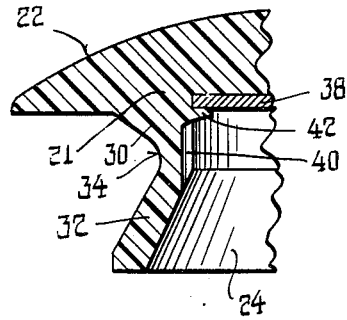
INVENTOR.
Harry A. Lockwood
BY
AGENT

United States Patent Office 2,951,461
Patented Sept. 6, 1960

2,951,461

HUMIDITY INDICATOR DEVICE AND COMBINATION THEREOF WITH CONTAINER

Harry A. Lockwood, Weston, Conn. (% DriAire Incorporated, 132 S. Main St., South Norwalk, Conn.)

Filed Nov. 12, 1958, Ser. No. 773,336

5 Claims. (Cl. 116—114)

This invention relates to devices which are intended to indicate the humidity of gaseous or fluid mediums, and more particularly to devices of this type as used in conjunction with closed vessels or containers, especially small containers such as boxes and the like, bags, cans etc.

In the past various humidity indicator devices have been proposed, for use in connection with packaged goods, sealed containers and the like. Such humidity indicators have been generally constituted of multi-part metal casings or the like with transparent windows, being adapted for securement to the container walls as by screw-threaded fittings or draft means. Various gaskets and sealing washers have been utilized, to provide a tight, sealing connection between the casing and the container wall, and separate supporting means have also been provided in conjunction with the casing, to support a moisture-sensitive indicating element in a position within the container where it may be viewed through the transparent window of the device.

These prior devices have had a number of disadvantages. For one thing, they have been constituted of an appreciable number of separate pieces arranged to interfit with each other, thus requiring close tolerances and relatively expensive machining or other manufacturing operations. Also, by virtue of the multipart construction there always existed the possibility of an imperfect seal resulting between the casing of the humidity indicator and the wall of the container. The assembly of the indicator device to the container was time consuming and required a certain amount of skill on the part of the personnel involved. In addition, there was always the possibility that an improper or incorrect assembly could be made, resulting in a faulty device. The large number of parts further represented an appreciable manufacturing cost, and necessitated extensive inventories, which therefore complicated the manufacture and sale of these devices.

The above disadvantages and drawbacks of prior humidity indicator devices are obviated by the present invention, and one object of the invention is to provide a novel and improved humidity indicator device for incorporation in a container wall, which device is of the utmost simplicity and involves components which are simple to manufacture, assemble, and also to install or attach to the container.

A further object of the invention is to provide an improved humidity indicator device as above set forth, which at all times provides a reliable and effective seal with the wall of the container in which it is installed, said seal being independent of any skills or operations on the part of the installing personnel.

Another object of the invention is to provide an improved humidity indicator device as above characterized, which is extremely compact in its structure and makeup, and of relatively small size whereby it may be used even in places where space is greatly restricted.

Yet another object of the invention is to provide an improved humidity indicator in accordance with the foregoing, which is so arranged that the indication is given over a very wide viewing angle, whereby the viewing of the device is greatly simplified and made more convenient.

A feature of the invention resides in the provision of an improved humidity indicator of the type set forth, wherein a relatively large area or portion of the sensing element is accessible to view, and may be further readily magnified, thereby to further facilitate the obtaining of readings.

A further feature of the invention resides in the provision of a humidity indicator as above set forth, which is extremely light in weight especially adapting it to flexible containers such as bags.

Another feature of the invention resides in the provision of a novel humidity indicator device which may be easily and quickly applied to or incorporated in the wall of a container, and which may be also easily and quickly removed therefrom if this latter should be desired.

Still another feature of the invention resides in the provision of a simplified humidity indicator having the above advantages and which consists of the least possible number of separate parts or components.

A further object of the invention is to provide an improved indicator device having all of the above features and which is nevertheless inexpensive to produce, assemble, and apply.

An additional feature of the invention resides in the provision of an improved humidity indicator device of the above character, which is devoid of edges or shoulders which project to any appreciable extent and might as a consequence constitute an obstructing means for adjoining objects, or constitute an undesirable projection which could catch onto adjoining containers, to interfere with the movement or placement of the same.

Other features and advantages will hereinafter appear.

In the drawings accompanying this specification, similar characters of reference are used to designate like components throughout the several views, in which:

Figure 1 is a perspective view of a container in the form of a sealed package, having incorporated in one wall thereof the improved humidity indicator device of the invention.

Fig. 2 is a fragmentary sectional view, enlarged, taken on the line 2—2 of Fig. 1.

Fig. 3 is a fragmentary sectional view showing a portion of Fig. 2 further enlarged, to more clearly reveal details of construction.

Fig. 4 is an enlarged rear elevational view of the humidity indicator device per se.

Fig. 5 is a perspective view of a different type of container, having incorporated in one wall the humidity indicator device of the invention. The container of Fig. 5 is in the form of a sealed flexible bag, of the type referred to as a flexible barrier.

Referring first to Fig. 1 there is shown a rectangular container or package 10 which may be constituted as a box, formed of suitable material as required by the character of the contents which are to be packaged. The box 10 may, for example, be fabricated from moisture and vapor-proof material such as impregnated board, cardboard, molded or sheet plastic, metal, foil or the like. As shown in Figs. 1 and 2, the container 10 may be provided with an outer protective wrapping 12 which may be merely for purposes of mechanical protection or may be also constituted to provide a more or less effective seal for the box or container. Securing or sealing adhesive strips 14 may be further placed about the exterior of the container 10, as determined by the particular requirements of the packaging.

In accordance with this invention, I provide for use in conjunction with a container as for example the box or package 10 a greatly simplified, novel and improved humidity indicator device 16, arranged to be incorporated in one wall 18 of the box by being disposed in an aperture 20 provided in the said wall, see Fig. 2.

As seen clearly in Figs. 2, 3 and 4, the humidity indicator device 16 is constituted of a button-like member 21 having a front convex end and face 22, and further having a shank portion 24 adapted to extend through the aperture 20 in the container wall 18.

While the member 21 is shown as preferably having a button-like shape, it should be understood that the invention is not to be limited to this particular shape or configuration, nor to the specific, exact structures illustrated and described but instead is more properly defined by the scope of the appended claims.

The member 21 has a shoulder means adjacent its front or exterior end and adjoining the said shank portion 24, said shoulder means comprising an annular, peripheral flange 26 extending radially outward from the shank portion 24. The said flange 26 or shoulder means is arranged for engagement with the outer surface of the container wall 18, and if desired a flat washer or gasket 28 may be provided, extending around the shank portion 24 and engaged with the flange 26 to provide a seal between the said flange and the wrapper 12 of the container. It should be understood, however, that the use of the sealing washer 28 is optional, and that such washer may be dispensed with, especially where the wall of the container is not of a composite nature but instead is constituted of a single thickness of material.

As seen in Figs. 2 and 3 the shank portion 24 of the member 21 is hollow and preferably has walls of substantially uniform thickness, said shank portion being constituted of a relatively short tapered part 30 and a relatively long oppositely tapered part 32, the latter terminating at the back or inner end of the member 21. As shown, the parts 30 and 32 of the shank portion 24 meet at a common small peripheral zone of small diameter, indicated at 34 in Fig. 3.

The maximum diameter or peripheral dimension of the relatively long tapered part 32 of the shank portion 24 is made slightly smaller than the corresponding dimensions of the aperture 20 in the wall 18 of the container 10 whereby the member 21 may be applied to the container by passing the shank portion 24 through the opening 20 as clearly shown in Fig. 2.

In accordance with the present invention, the member 21 as above characterized is arranged to coact with a single, simple, resilient annular fastening and sealing member or ring 36, by which the member 21 is not only securely retained in the container wall 18 but also by which a novel and effective seal is established between the member 21 and the container wall, preventing ingress or egress of gas or fluid through the aperture 20 past the member. The fastening and sealing ring or annulus 36 is constituted of a resilient material such as flexible rubber or rubber-like substance, said annulus being adapted to be carried in a stretched condition by the tapered part 32 of the shank portion 24 of the member 21, whereby it effects intimate engagement with the tapered peripheral surface of the shank portion and also with the inner smooth surface of the container wall 18. I have found that such intimate contact, as effected by the stretched resilient annulus results in an extremely effective and reliable seal being established between the container wall and the member 21 while at the same time the said member is securely mechanically held in the wall 18 against inadvertent or accidental dislodgement.

In order to assemble the member 21 to the container wall 18, it is merely necessary to pass the shank portion 24 of the member 21 through the opening 20, and to thereafter stretch and force the resilient annulus 36 over the enlarged end of shank 24 whereupon the annulus will snap into place against the inside of the container wall 18 as shown in Fig. 2 while still remaining in a stretched condition. The resilient annulus 36 may be advantageously constituted as a relatively thick, strong rubber O-ring, as will be readily understood.

It will now be seen that, regardless of whether or not the sealing washer 28 is used under the peripheral flange 26 of the member 21, an effective seal will be established between the wall 18 of the container and the tapered shank portion 24 of the member, by virtue of the resilient annulus 36.

It may be further observed that the relatively short tapered part 30 of the shank portion 24 serves as a centering means, to effect a centering of the member 21 in the aperture 20 of the container wall 18, thereby to properly position the above described parts and render most effective the seal established by the annulus 36.

Further, in accordance with the present invention, I provide within the hollow shank portion 24, in a novel manner, a moisture-sensitive indicating element 38, which may advantageously be in the form of a thin, flat disk of material such as cardboard, thick paper or the like. The moisture indicating disk 38 may be suitably chemically treated, as for example by a solution of cobaltus chloride and water, to render it responsive to moisture or humidity. It will be understood that the indicating element 38 may be so constituted that it changes color in the presence of humidity. The disk 38 preferably closely fits the bore of the hollow shank 24 at the front end thereof, within the front convex portion of the member 21. For the purpose of securing the moisture-sensitive disk 38 in place, the side walls of the bore may be scored or staked at a plurality of places, as indicated at 40, by the use of a suitable tool, to raise a lip or nib 42 which extends over rear peripheral portions of the disk 38 to retain the latter in place. Further, when the member 21 is constituted of a transparent or translucent plastic composition as at present preferred, the staking of the disk 38 may be performed by a heated tool or punch which melts and flows the plastic substance to provide the desired retaining lips 42. Thus, the assembly of the disks 38 to the members 21 may be easily and quickly effected, by merely dropping the disks in the bores of the shank portions and thereafter inserting the heated staking tool, and such assembly may be readily carried out by relatively simple automatic equipment.

It will be noted that where the member 21 is constituted of a transparent plastic substance, the convex front end portion of the member acts as a magnifying lens, thereby to enable the indicator element 38 to be more readily viewed. Also, the said indicator element is seen to have a relatively large surface disposed closely adjacent the front convex end of the member 21, whereby it is readily seen, and may be viewed easily through a wide viewing angle. Thus, the present humidity indicator device facilitates the reading of humidity conditions within the container 10 by virtue of the fact that the sensing element 38 has a relatively large expanse which is easily viewed from the exterior of the container.

Referring to Fig. 5 of the drawings there is shown another type of container, indicated generally by the numeral 45, such container being in the form of a flexible bag of the type which is commonly termed a "flexible barrier." The container 45 may be constituted of two identical halves formed from laminated sheet material as shown, each of said halves having laterally displaced body portions 47 and having flat or planar marginal portions 48 which are joined together broadside to each other as by a suitable joining and sealing operation. The laminated structure of the halves of the container 45 may include one or several layers of metal foil to provide a water-vapor proof lining or barrier, as is well understood in the art. The present improved humidity indicator device is admirably suited for use with flexible bags or barriers of the type shown in Fig. 5. The indicator device, designated generally by the numeral 50 in Fig. 5, is applied to one wall of the flexible barrier in a manner similar to that described in connection with the container 10 shown in Fig. 1. Because of its small size and light weight, together with the absence of projecting or protruding shoulders, the indicator device 50 is especially suited for such use, as it will not tend to tear or appreciably deform the container wall.

Instead of the flexible barrier 45 shown in Fig. 5, containers in the form of metal cans, known also as "rigid barriers," may have the present improved humidity indicators incorporated in them. Such rigid barriers or cans may have recessed top or bottom portions, in which the indicator devices may be placed, and by virtue of the small protrusion of such devices they will not interfere with the stacking or nesting of the cans.

It will now be understood from the foregoing that the seal effected will be excellent even with a thin, flexible bag wall. Moreover, the novel and improved, effective humidity indicator device as provided by this invention is of extremely simple construction, having relatively few parts which may be easily and quickly fabricated and assembled. Also, the indicator device may be readily and quickly attached to the apertured wall of a container, and will provide an effective seal therewith, preventing ingress or egress of gas or fluid through the opening of the container wall. Moreover, by virtue of the relatively few parts of the indicator device, unskilled personnel may be employed to assemble these to the containers, and because of the distinctive action of the resilient sealing annulus 36 the seal effected by the indicator device will be independent of the manner of its assembly to the container, the only requirement being the snapping of the resilient annulus over the enlarged end of the hollow shank portion 24 of the member 21.

It will now be appreciated that the present indicator device is of further advantage in that the sensing element or disk 38 has its entire surface on one side exposed to view at the front of the member 21, and has the entire surface of the other side directly exposed to the medium within the container 10. Also, by virtue of the one piece construction of the member 21 there is eliminated all possibility of imperfect assembly of separate components, and accordingly it is not possible for leakage of fluid or gas to occur due to interfitting parts being not properly related to each other. It will be readily seen from an inspection of Fig. 2 that the low, rounded external portion of the member 21 is so constituted that no high protruding or projecting shoulders exist, which might catch onto adjoining articles and cause interference therewith, and this is an important feature of the invention.

Variations and modifications may be made within the scope of the claims, and portions of the improvement may be used without others.

I claim:

1. An indicator device for attachment to an apertured wall of a container, comprising a transparent member having a shank portion adapted to extend through the wall aperture and having shoulder means adjacent its exterior end and adjoining said shank portion, for engagement with the outer surface of the container wall to position the member therein, said shank portion having a smooth, tapered, exterior peripheral surface arranged to be located within the container when the member is in place on said wall; a resilient sealing annulus adapted to be carried in stretched condition by the shank of said member in engagement with the said tapered peripheral surface thereof and adapted further to engage the inside of the container wall, thereby to retain the member in said wall, said annulus being held taut about the shank when stretched and having smooth surfaces for effecting a seal with the said shank portion and container wall to prevent passage of fluid through the wall aperture past said member, said shank portion having a surface at its interior side which is exposed to the interior of the container and is visible through the shank portion from the exterior end thereof, said exposed surface being subjected to atmospheric conditions within the container and said shank portion constituting a plug for closing and sealing the aperture of the container wall.

2. An indicator device for attachment to an apertured wall of a container, comprising a transparent member having a hollow shank portion adapted to extend through the wall aperture and having shoulder means adjacent its exterior end and adjoining said shank portion, for engagement with the outer surface of the container wall to position the member therein, said shank portion having a smooth tapered, exterior peripheral surface arranged to be located within the container when the member is in place on said wall; a resilient sealing annulus adapted to be carried in stretched condition by the shank of said member in engagement with the said tapered peripheral surface thereof and adapted further to engage the inside of the container wall, thereby to retain the member in said wall, said annulus being held taut about the shank when stretched and having smooth surfaces for effecting a seal with the said shank portion and container wall to prevent passage of fluid through the wall aperture past said member, said shank portion having a surface at its interior side which is exposed to the interior of the container and is visible through the shank portion from the exterior end thereof, said exposed surface being subjected to atmospheric conditions within the container well, said interior side surface being disposed within the hollow of the shank portion.

3. An indicator device for attachment to an apertured wall of a container, comprising a transparent member having a hollow shank portion adapted to extend through the wall aperture and having shoulder means adjacent its exterior end and adjoining said shank portion, for engagement with the outer surface of the container wall to position the member therein, said shank portion having a smooth tapered, exterior peripheral surface arranged to be located within the container when the member is in place on said wall; and said exterior end being convex and constituting a magnifying lens; a resilient sealing annulus adapted to be carried in stretched condition by the shank of said member in engagement with the said tapered peripheral surface thereof and adapted further to engage the inside of the container wall, thereby to retain the member in said wall, said annulus being held taut about the shank when stretched and having smooth surfaces for effecting a seal with the said shank portion and container wall to prevent passage of fluid through the wall aperture past said member, said shank portion having a surface at its interior side which is exposed to the interior of the container and is visible in magnified form through the shank portion from the exterior end thereof, said exposed surface being subjected to atmospheric conditions within the container and said shank portion constituting a plug for closing and sealing the aperture of the container wall, said interior side surface being disposed within the hollow of the shank portion.

4. An indicator device for attachment to an apertured wall of a container, comprising a member having a shank portion adapted to extend through the wall aperture and having shoulder means adjacent its exterior end and adjoining said shank portion, for engagement with the outer surface of the container wall to position the member therein, said shank portion having a smooth, tapered, exterior peripheral surface arranged to be located within the container when the member is in place on said wall, and having a second tapered exterior surface disposed between the shoulder means and said smooth tapered surface, for centering the member in the wall aperture; a resilient sealing annulus adapted to be carried in stretched condition by the shank of said member in engagement with the said tapered peripheral surface thereof and adapted further to engage the inside of the container wall, thereby to retain the member in said wall, said annulus having smooth surfaces for effecting a seal with the said shank portion and container wall to prevent passage of fluid through the wall aperture past said member, said shank portion having a surface at its interior side which is exposed to the interior of the container and is visible through the shank portion from the exterior end thereof; said exposed surface being subjected to atmospheric conditions within the container and said shank portion constituting a plug for closing and sealing the aperture of the container wall.

5. A humidity indicator device for attachment to an apertured wall of a container, comprising a transparent member having a hollow shank portion provided with an axial bore and adapted to extend through the wall aperture and having shoulder means adjacent its exterior end and adjoining said shank portion, for engagement with the outer surface of the container wall to position the member therein, said shank portion having a smooth tapered, exterior peripheral surface arranged to be located within the container when the member is in place on said wall and said exterior end being convex and constituting a magnifying lens; a resilient sealing annulus adapted to be carried in stretched condition by the shank of said member in engagement with the said tapered peripheral surface thereof and adapted further to engage the inside of the container wall, thereby to retain the member in said wall, said annulus having smooth surfaces for effecting a seal with the said shank portion and container wall to prevent passage of fluid through the wall aperture past said member; and a moisture-sensitive indicating element in the form of a flat disk carried by the said member in the hollow shank portion thereof at the end of the axial bore and adjacent the exterior end of the member, said disk being arranged to communicate with the container interior when the member is in place and being visible in enlarged form at the exterior magnifying end of the member to provide an easily seen indication of the humidity existing within the container, and said disk being disposed in a plane closely adjacent the plane of the said shoulder means.

References Cited in the file of this patent

UNITED STATES PATENTS

| | | |
|---|---|---|
| 2,114,105 | Gerber | Apr. 12, 1938 |
| 2,716,338 | Blinn | Aug. 30, 1955 |
| 2,844,026 | Weschmeyer | July 22, 1958 |

FOREIGN PATENTS

| | | |
|---|---|---|
| 284,120 | Great Britain | Jan. 26, 1928 |